United States Patent [19]

Naka

[11] Patent Number: 4,692,090

[45] Date of Patent: Sep. 8, 1987

[54] MULTISTAGE HYDRAULIC MACHINE

[75] Inventor: Shigekatsu Naka, Yokohama, Japan

[73] Assignee: Tokyo Shibaura Denki Kabushiki Kaisha, Japan

[21] Appl. No.: 893,464

[22] Filed: Aug. 8, 1986

Related U.S. Application Data

[63] Continuation of Ser. No. 729,091, May 2, 1985, abandoned, which is a continuation of Ser. No. 357,147, Mar. 11, 1982, abandoned.

[30] Foreign Application Priority Data

Mar. 23, 1981 [JP] Japan .................................. 56-41890
Jan. 14, 1982 [JP] Japan .................................. 57-3368

[51] Int. Cl.$^4$ .......................... F04D 9/00; F04D 29/14
[52] U.S. Cl. .................................. 415/112; 415/115; 415/160; 415/180; 415/500
[58] Field of Search .................. 415/110–113, 415/115, 116, 150, 156, 159, 160, 175, 176, 179, 180, 500

[56] References Cited

U.S. PATENT DOCUMENTS

| 1,362,304 | 12/1920 | Harza | 290/52 |
| 1,823,702 | 9/1931 | Ring | 415/112 UX |
| 2,082,927 | 6/1937 | White | 415/110 |
| 3,172,640 | 3/1965 | Sproule | 415/117 |
| 3,367,628 | 2/1968 | Fitton | 415/110 |
| 3,370,828 | 2/1968 | Willi | 415/500 X |
| 3,985,464 | 10/1976 | Hachiya et al. | 415/175 X |
| 4,047,831 | 9/1977 | Mayo, Jr. et al. | 415/1 |
| 4,406,577 | 9/1983 | Ichikawa | 415/500 X |

FOREIGN PATENT DOCUMENTS

| 600273 | 5/1932 | Fed. Rep. of Germany | 415/500 |
| 550326 | 6/1974 | Switzerland | |

Primary Examiner—Robert E. Garrett
Assistant Examiner—Joseph M. Pitko
Attorney, Agent, or Firm—Finnegan, Henderson, Farabow, Garrett & Dunner

[57] ABSTRACT

A multistage hydraulic machine includes a water chamber in a bottom ring of the highest-pressure stage. The water chamber supplies cooling water to seal gaps between rotary and stationary elements through a communication passage connected to the water chamber.

2 Claims, 8 Drawing Figures

MULTISTAGE HYDRAULIC MACHINE

This application is a continuation, of application Ser. No. 729,091, filed May 2, 1985 now abandoned which is a Rule 62 file wrapper continuation of application Ser. No. 357,147, filed Mar.11, 1982, now abandoned.

BACKGROUND OF THE INVENTION

This invention relates to multistage hydraulic machines, and more particularly to apparatus for cooling areas of a multistage hydraulic machine developing high heat between rotary and stationary elements of the machine.

Often a multistage hydraulic machine involving a pump-turbine is used to generate electricity during the day and pump water from a lower level to a higher level during the night, that is, during periods in which the demand for electricity is not high. By supplying pressurized air in a runner chamber, the water is exhausted from the water passageway after an electricity generation cycle and before a pump cycle to avoid high load on the runners in starting up the pumping operation. During this phase modification the runners may be rotated in air for a considerable period of time and high frictional heat develops between the rotary and stationary elements of the machine.

Consequently, the runners will become larger because of thermal expansion and the seal gaps between the rotary elements, such as peripheral edges of the runner, and the stationary elements, such as a head cover, a bottom ring and a return ring, will become smaller. The rotating runners may even contact the stationary elements and be damaged.

In order to avoid possible contact between the runner and the stationary elements, cooling water is ordinarily supplied to the runner seal gap, that is, between the peripheral portion of the runner and a liner of the bottom ring. By supplying the cooling water, the runner is cooled and the seal gap is kept open. In the case of a monostage hydraulic machine, it is easy to provide a supply pipe for supplying the cooling water to the runner seal portion, because there is a concrete foundation, under the bottom ring, through which the cooling water can flow.

However, in the case of a multistage hydraulic machine, the return passages of a plurality of the runner chambers are connected serially, so that this hydraulic machine has a complicated water flow passage. It is more difficult to supply cooling water to a runner seal portion at a higher-pressure stage than to a lower-pressure stage of the water flow passage. Accordingly, it has not been possible in the prior art to cool high friction areas of a multistage hydraulic machine adequately when it is occupied in changing over from electricity generation to pumping water or during a condenser operation, and the runners are operating in air for a considerable period of time.

SUMMARY OF THE INVENTION

It is, therefore, an object of this invention to provide a multistage hydraulic machine in which a condenser operation can be conducted and the runners can be rotated in air for a considerable period of time.

The multistage hydraulic machine of the invention comprises a rotatable shaft, a plurality of runners mounted on the rotatable shaft, each of the runners being contained in an individual runner chamber to form a plurality of stages, a stationary element associated with each of the runners, a seal gap between each of the runners and the associated stationary element, a water chamber formed in the stationary element of the highest-pressure stage, means for communicating water from the water chamber to the seal gap of at least the highest pressure stage, and means for supplying the water to the water chamber.

DESCRIPTION OF THE PREFERRED EMBODIMENTS

This invention will be described with respect to a two-stage pump-turbine as an example of the invention.

Figure 1:
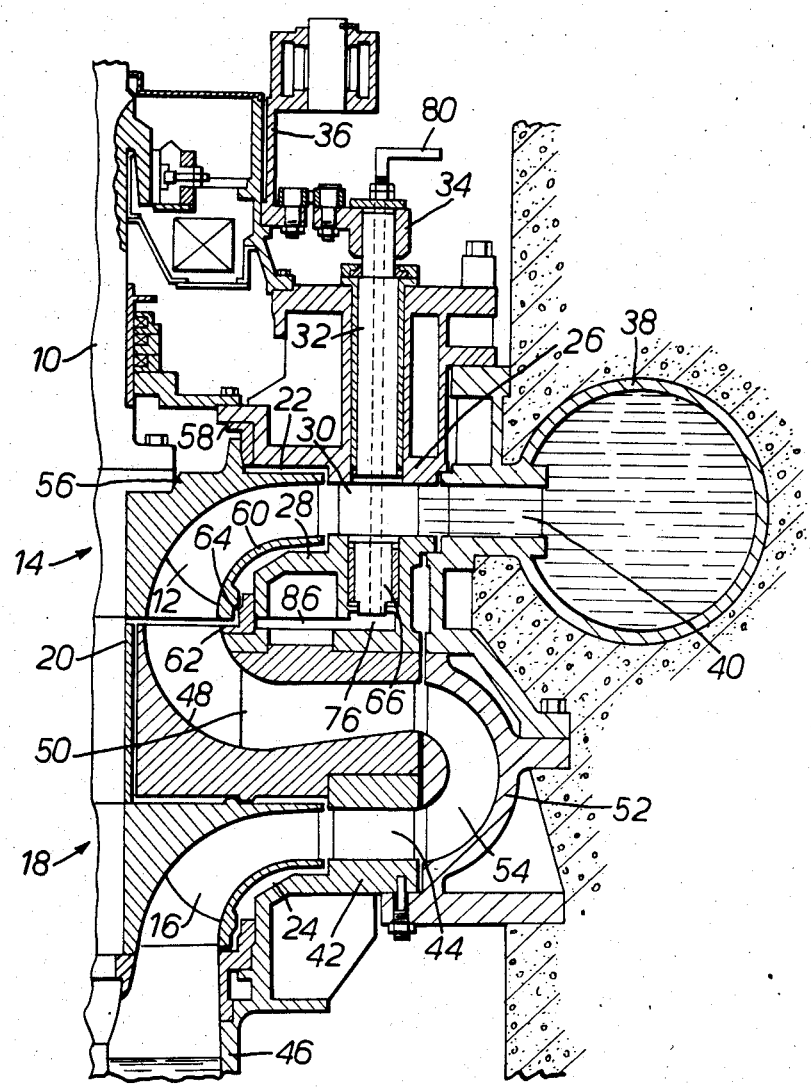
FIG. 1 is a longitudinal sectional view of a two-stage pump-turbine according to this invention.

Referring to FIG. 1, on a shaft 10 of the two-stage pump-turbine, a runner 12 for a higher-pressure stage 14 and a runner 16 for a lower-pressure stage 18 are mounted, coaxially. A shaft sleeve 20 is mounted on shaft 10 between the two runners 12 and 16.

Runner 12 is contained in a higher-pressure stage chamber 22, and runner 16 is contained in a lower-pressure stage chamber 24.

A head cover 26 is provided over runner 12, and a bottom ring 28 is provided under the runner. Higher-pressure stage chamber 22 is formed by head cover 26 and bottom ring 28. Movable guide vanes 30 providing variable openings for the water path are positioned between head cover 26 and bottom ring 28.

Movable guide vanes 30 are arranged in a circular pattern around runner 12 at the higher-pressure stage 14. In this embodiment, movable guide vanes 30 are provided at the higher-pressure stage. The upper ends of upper stems 32 which are formed with movable guide vanes 30 are connected to a well-known guide vane drive link mechanism 34. Movable guide vanes 30 are opened or shut by a guide ring 36 of mechanism 34.

Moreover, there is provided a spiral casing 38 having stay vanes 40 which are arranged in a circular pattern around movable guide vanes 30.

A bottom ring 42 is provided under runner 16 at lower-pressure stage 18. Stay vanes 44 of bottom ring 42 are arranged in a circular pattern around runner 16. The bottom end of bottom ring 42 is connected to a draft tube 46.

A return ring 48 is provided between bottom ring 42 and bottom ring 28 of higher-pressure stage 14 as a head cover for runner 16 of lower-pressure stage 18. Return ring 48 has a plurality of return vanes 50 for regulating the water flow.

An outer casing 52 having return passages 54 connects return ring 48 to lower-pressure stage 18.

A runner crown 56 of runner 12 at higher-pressure stage 14 is sealed by an upper cover liner 58 mounted on head cover 26. A runner band 60 of runner 12 is sealed by a lower cover liner 62 mounted on bottom ring 28. There is a seal gap 64 between runner band 60 and lower cover liner 62.

Figure 2:
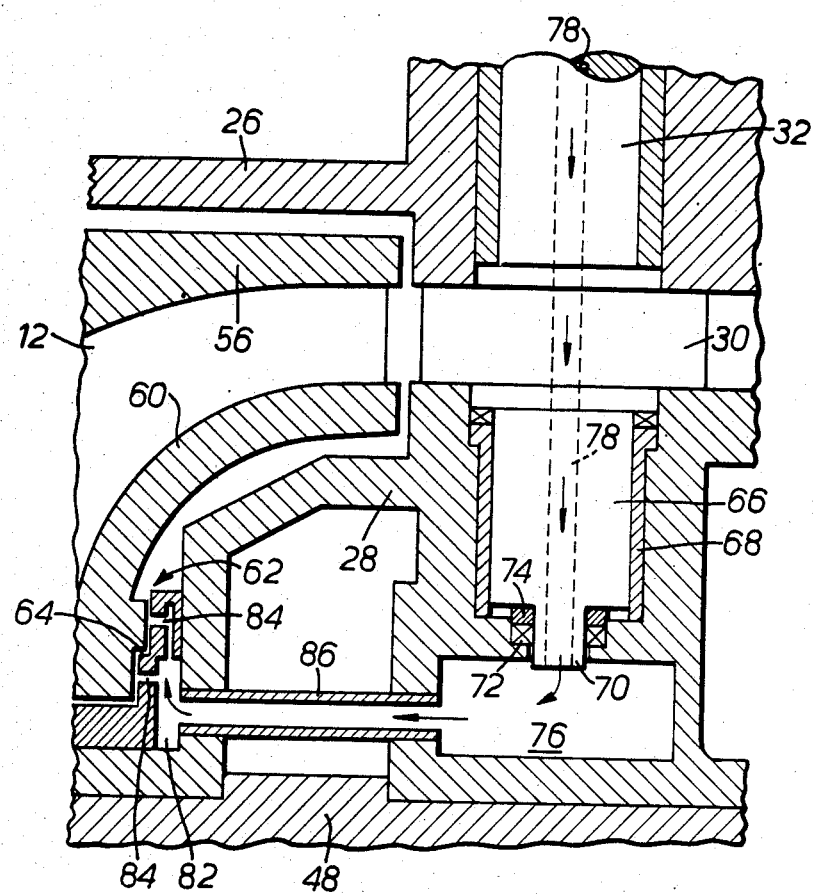
FIG. 2 is an enlarged view of a portion of FIG. 1.

Referring to both FIGS. 1 and 2, a lower stem 66 which is formed with movable guide vane 30 is pivoted in bottom ring 28 by an oilless bearing 68. The end of lower stem 66 has a small diameter portion 70. A packing 72 and a packing clamp 74 are located between a small diameter portion 70 of lower stem 66 and bottom ring 28.

There is provided a cooling water chamber 76 under small diameter portion 70 in bottom ring 28. In this embodiment, preferably two or four separate cooling water chambers 76 may be provided in the higher pressure stationary element 28. On the other hand, a continuous annular cooling water chamber may be provided along higher-pressure runner 12.

The cooling water is supplied to chamber 76 through a supply passage 78 along the axis of upper stem 32, guide vane 30 and lower stem 66. A water supply source (not shown) is connected to supply passage 78 through a water supply pipe 80.

Referring again to FIG. 2, lower cover liner 62 has a water guide chamber having connection passages 84 opening to seal gap 64. Cooling water chamber 76 and water guide chamber 82 are connected by a communication pipe 86. The number of communication pipes 86 is equal to that of cooling water chambers 76 which may be provided separately in a circular pattern around higher-pressure stage runner 12. In the case of a continuous annular cooling water chamber around runner 12, an appropriate number of communication pipes 86 may be arranged radially.

According to this embodiment, the cooling water is supplied to cooling water chamber 76 through water supply pipe 80 and supply passage 78 from the water supply source. Furthermore, the cooling water is supplied to water guide chamber 82 through communication pipe 86 from cooling water chamber 76 and to seal gap 64 through connection passages 84. Consequently, seal gap 64 is filled with the cooling water and runner band 60 is cooled.

Figure 3:
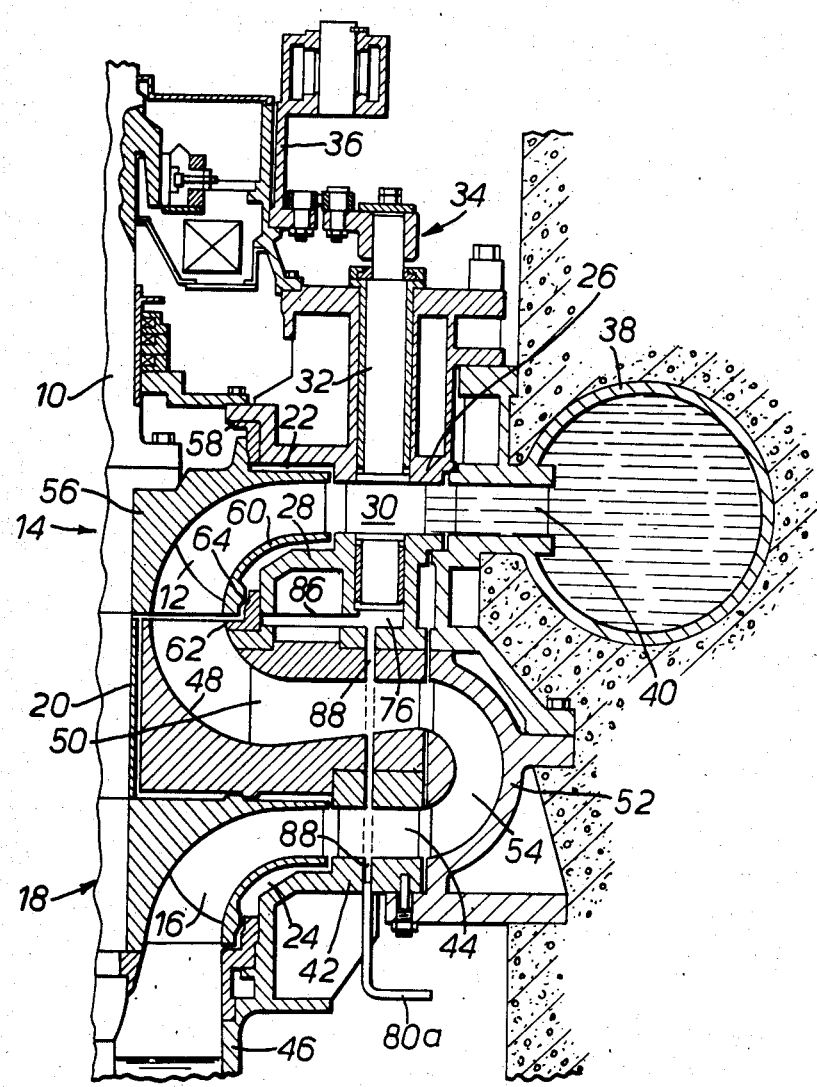
FIG. 3 is a longitudinal sectional view of a second embodiment according to this invention.

Referring to FIG. 3, a second embodiment will be described according to this invention.

In the embodiment shown in FIG. 3, the cooling water supply passage is different from the one shown in FIGS. 1 and 2. In this embodiment, cooling water supply passage 88 is provided to pass through bottom ring 42 of lower-pressure stage 18, stay vane 44, return ring 48, and bottom ring 28 of higher-pressure stage 14. The lower end of cooling water supply passage 88 is connected to water supply pipe 80a.

According to this embodiment, the cooling water is supplied to cooling water chamber 76 through cooling water supply passage 88. After that, the cooling water is led to guide water chamber 82 through communication pipe 86 and is supplied to seal gap 64 through connection passages 84, as shown in the first embodiment.

Figure 4:
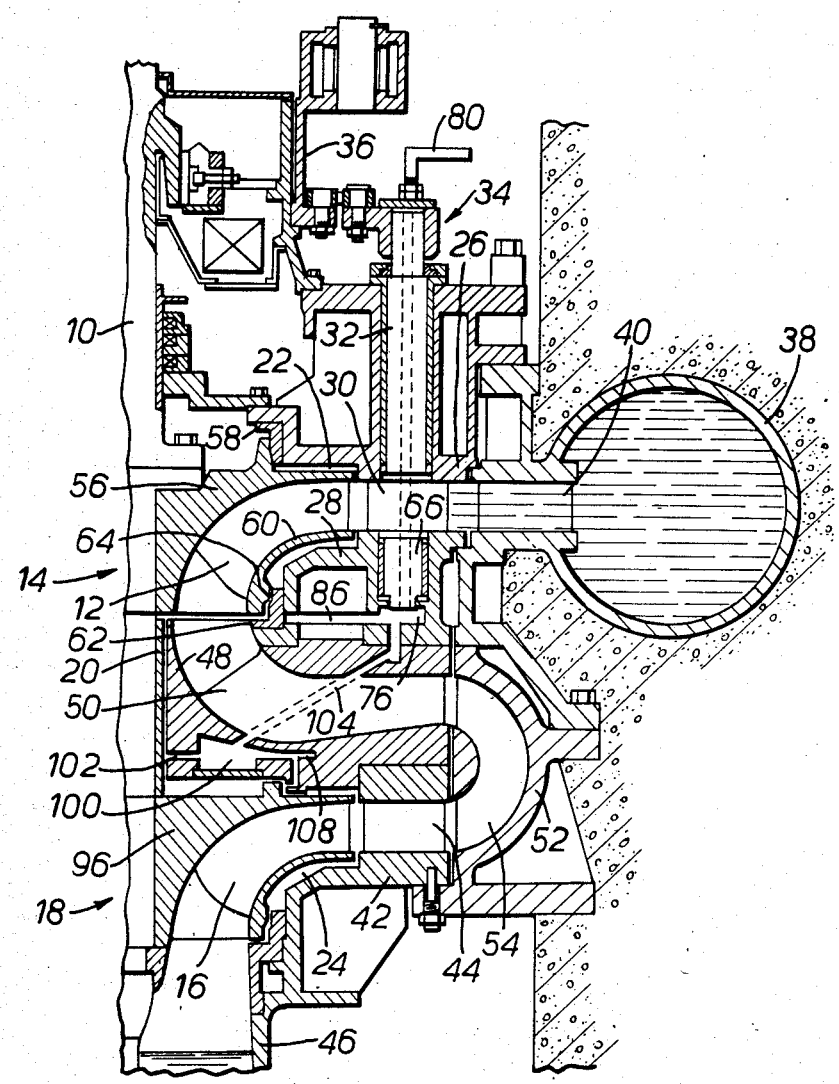
FIG. 4 is a longitudinal sectional view of a third embodiment according to this invention.
Figure 5:
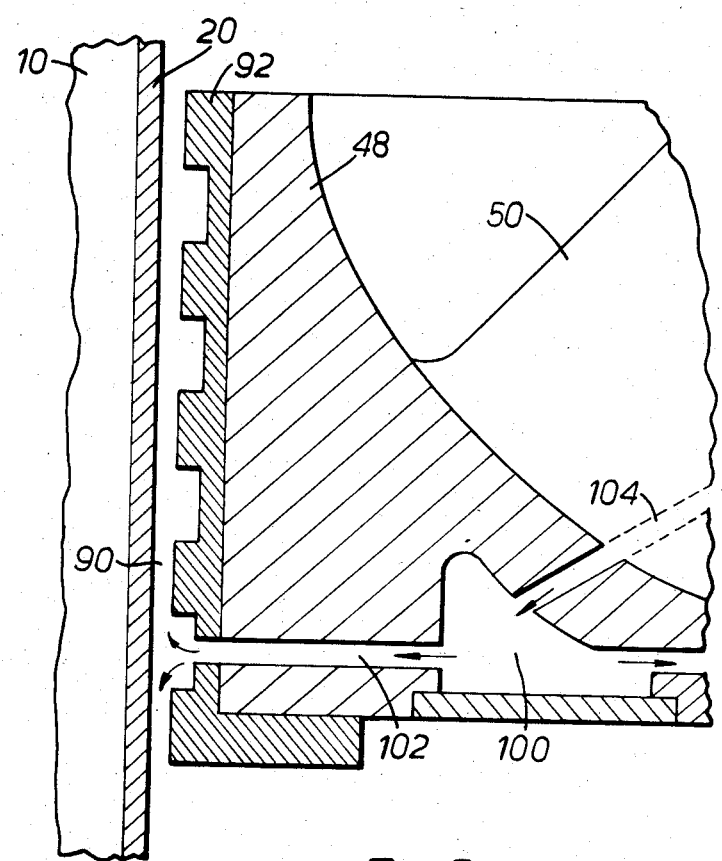
FIGS. 5 and 6 are enlarged views of portions of FIG. 4.
Figure 6:
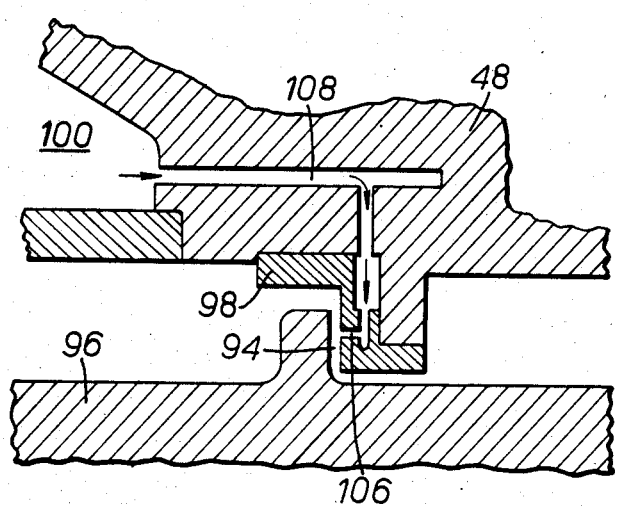

Referring to FIGS. 4, 5 and 6, a third embodiment will be described according to this invention. In particular, a seal gap 90 between shaft sleeve 20 and a seal liner 92 of return ring 48 and a seal gap 94 between runner crown 96 of lower-pressure stage 18 and a seal liner 98 of return ring 48 are shown.

As shown in FIG. 5, return ring 48 has a pressure chamber 100. A communication passage 102 opening to seal gap 90 is connected to pressure chamber 100. The cooling water from water chamber 76 is supplied to pressure chamber 100 through a communication passage 104 in return ring 48 and is supplied to seal gap 90 through communication passage 102.

As shown in FIG. 6, seal liner 98 has a connection passage 106 opening to seal gap 94. Connection passage 106 is connected to pressure chamber 100 through a communication passage 108 in return ring 48. The cooling water from pressure chamber 100 is supplied to seal gap 94 through communication passage 108 and connection passage 106.

Figure 7:
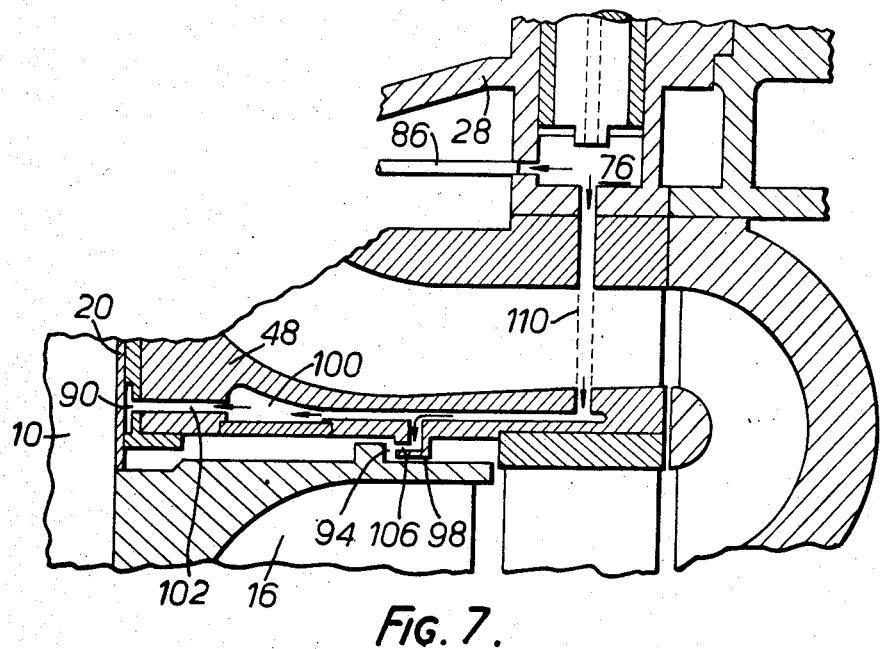
FIG. 7 is and enlarged longitudinal sectional view of a variation of the embodiment of FIG. 4.

A variation in the embodiment of FIG. 4 is shown in FIG. 7. As shown therein, the cooling water may be supplied to seal gap 94 between runner 16 of lower-pressure stage 18 and return ring 48 through connection passage 106 and a communication passage 110 which is directly connected to water chamber 76. In the structure of FIG. 7, the cooling water is supplied to seal gap 90 through pressure chamber 100 and communication passage 110.

Figure 8:
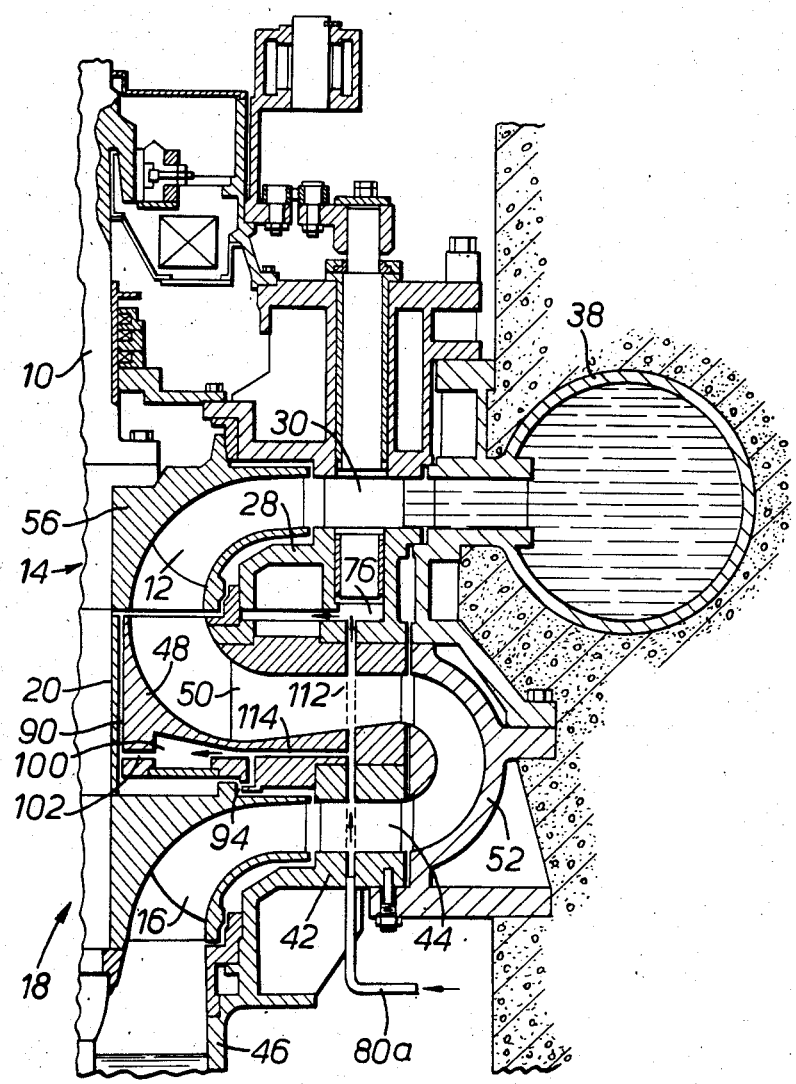
FIG. 8 is a longitudinal sectional view of a further variation of the embodiment of FIG. 4.

A further variation in the embodiment of FIG. 4 is shown in FIG. 8. As shown therein, a cooling water supply passage 112 is provided to pass through bottom ring 42 of lower-pressure stage 18, stay vane 44, return ring 48 and bottom ring 28 of higher-pressure stage 14. The lower end of cooling water supply passage 112 is connected to water supply pipe 80a. Pressure chamber 100 amd seal gap 94 are connected to supply passage 112 through a communication passage 114.

According to the structure of FIG. 8, the cooling water is supplied to seal gap 90 through communication passage 102, pressure chamber 100 and communication passage 114 from supply passage 112 and is supplied to seal gap 94 through communication passage 114 from supply passage 112.

In the aforementioned embodiments, this invention is applied to a two-stage pump-turbine in which variable guide vanes are provided at the higher-pressure stage. However, this invention may be applied to a two-stage pump-turbine in which varibable guide vanes are also provided at the lower-pressure stage. Furthermore, this invention also may be applied to multistage pump-turbine which have more than two stages.

According to this invention, cooling water is supplied to the seal gap formed between the rotary and stationary elements. the runner is effectively cooled when the multistage hydraulic machine is operated for phase modification and the machine runs in air during starting pump operation. Any contact between the rotary and stationary elements of the machine can thus be avoided.

What is claimed is :

1. A dual purpose electricity generating and water pumping multistage hydraulic machine including coaxially and vertically arranged stages, the highest-pressure stage being uppermost, the machine comprising:
   a rotatable shaft;
   a plurality of runners mounted on said rotatable shaft, each of said runners being contained in an individual runner chamber to form a plurality of stages;
   a stationary element associated with each of said runners;
   a seal gap between each of said runners and its associated stationary element;
   means for cooling said seal gap particularly when said machine is running dry, said means including:
   water chamber means formed in said stationary element of said highest-pressure stage for retaining water, said water chamber means including a plurality of water chambers arranged around each of said plurality of runners associated with said highest-pressure stage and within said stationary element of said highest-pressure stage;

means for communicating water from said water chamber means to said seal gap of at least said highest-pressure stage;

means for supplying water to said water chamber means; and movable guide vanes formed with upper and lower stems, said movable guide vanes being arranged in a circular pattern around said runner of at least said highest-pressure stage, wherein said supplying means includes a supply passage in said movable guide vanes and the upper and lower stems.

2. A dual purpose electricity generating and water pumping multistage hydraulic machine including coaxially and vertically arranged stages, the highest-pressure stage being uppermost, the machine comprising:

a rotatable shaft;

a plurality of runners mounted on said rotatable shaft, each of said runners being contained in an individual runner chamber to form a plurality of stages;

a stationary element associated with each of said plurality of runners, said stationary element including stay vanes arranged in a circular pattern around said runner of a lower-pressure stage and a return ring between said runners;

a seal gap between each of said plurality of runners and its associated stationary element;

means for cooling said seal gap particularly when said machine is running dry, said means including:

water chamber means formed in said stationary element of said highest-pressure stage for retaining water, said water chamber means including a plurality of water chambers arranged around each of said plurality of runners associated with said highest-pressure stage and within said stationary element of said highest-pressure stage;

mean for commiunciating water from said plurality of water chambers to said seal gap of at least the highest-pressure stage; and means for supplying water to said plurality of water chambers, said supplying means including a supply passage in said stay vanes and said return ring.

* * * * *